US009469259B2

(12) United States Patent
Grimm et al.

(10) Patent No.: US 9,469,259 B2
(45) Date of Patent: Oct. 18, 2016

(54) APPARATUS FOR INTEGRATING DATA FUNCTIONS IN A MOTION CONTROL SYSTEM FOR A VEHICLE

(71) Applicant: GM GLOBAL TECHNOLOGY OPERATIONS LLC, Detroit, MI (US)

(72) Inventors: Donald K. Grimm, Utica, MI (US); Wende Zhang, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 53 days.

(21) Appl. No.: 14/447,011

(22) Filed: Jul. 30, 2014

(65) Prior Publication Data

US 2016/0031388 A1 Feb. 4, 2016

(51) Int. Cl.

| | |
|---|---|
| ***H04L 29/08*** | (2006.01) |
| ***B60R 16/023*** | (2006.01) |
| ***B60Q 9/00*** | (2006.01) |
| ***B60K 35/00*** | (2006.01) |

(52) U.S. Cl.

CPC ............ *B60R 16/023* (2013.01); *B60K 35/00* (2013.01); *B60Q 9/00* (2013.01)

(58) Field of Classification Search

CPC . G07C 5/008; B60R 16/023; B60R 16/0373; G06Q 30/0621; G06F 17/00; H04L 67/12; B60Q 1/503

See application file for complete search history.

(56) References Cited

U.S. PATENT DOCUMENTS

| | | | | |
|---|---|---|---|---|
| 8,694,328 B1 * | 4/2014 | Gormley | ............ | G06Q 30/0621 705/1.1 |
| 2013/0238441 A1 * | 9/2013 | Panelli | .................. | B60Q 1/503 705/14.62 |

* cited by examiner

*Primary Examiner* — Thomas Tarcza
*Assistant Examiner* — Edward J Pipala
(74) *Attorney, Agent, or Firm* — Mickki D. Murray, Esq.; Parks IP Law LLC

(57) ABSTRACT

The present disclosure to systems for integration and communication of aftermarket vehicle components with existing vehicle components through an apparatus comprising a processor and a computer-readable medium including computer-executable instructions. The apparatus is configured to be integrated into a vehicle comprising an existing motion-control system having existing motion-control-system components. The instructions, when executed by the processor, cause the processor to perform operations comprising (i) receiving, from an aftermarket motion-control-system, an input data signal containing a raw data set, (ii) processing the raw data set, yielding a processed data set, and (iii) transmitting the processed data set to one or more of the existing motion-control system components within the vehicle.

15 Claims, 3 Drawing Sheets

300
103
315
310
345
320
111
400
335
120
160
330
347
116
325
125

APPARATUS FOR INTEGRATING DATA FUNCTIONS IN A MOTION CONTROL SYSTEM FOR A VEHICLE

TECHNICAL FIELD

The present technology relates to data processing within a vehicle. More specifically, the present technology relates to integrating media systems into pre-existing vehicle systems.

BACKGROUND

Modern vehicles may be outfitted with technology to provide a vehicle operator with access to data that he/she may need when operating the vehicle. The data may be received by any number of data input devices (e.g., cameras and sensors) and presented to the operator on a vehicle component (e.g., console display). An example data information system 101 is shown in FIG. 1.

As seen in FIG. 1, the information system 101 may receive information from one or more data input devices 110. Input device(s) may be factory installed or after-market components added to the vehicle to provide additional functionality.

For example, the input devices 110 may include cameras affixed to the vehicle in locations for collecting desirable image data. One or more cameras may be mounted to the front and/or rear fascia of a vehicle to perceive areas, which cannot be adequately observed by the vehicle operator while in the vehicle interior, e.g.,—an environment directly behind the vehicle. Additionally, one or more cameras may be mounted to the right and left portions of the vehicle to perceive objects in close proximity to the vehicle doors.

As another example, the input devices 110 may include one or more sensors or measuring devices mounted to internal or external surfaces of the vehicle for generating data or signals related to conditions, which often vary over time. The conditions may be internal to the vehicle (e.g., tire pressure) or external to the vehicle (e.g., ambient, or environmental temperature).

The information received by the data input devices 110 is transmitted to an input/output (I/O) system 120 by way of an input signal 115. The I/O system 120 manages interfaces between the input devices 110 and one or more data output devices 160 by using components such as a production connector 140 and a wiring assembly (e.g., harness 130). The I/O system 120 transmits an output signal 125, typically through the production connector 140, to the output device(s) 160 located within a center stack 150.

The center stack 150 is a corridor of interior space between a vehicle operator seat and a vehicle passenger seat, beginning at the dashboard and extending to the gearshift and often to a center console. The center stack 150 may also house processors executing one or more software applications 155 (e.g., a video application), media input components (e.g., universal serial bus (USB) or other auxiliary input), output components 160 (e.g., display), or the like.

The output component(s) 160 may provide information by visual, auditory, or tactile interfaces to a vehicle occupant about changing vehicle conditions (e.g., changing position of objects detected in a surrounding environment). For example, the output component 160 may display video data received from a camera on a rear fascia when the vehicle is shifted into the reverse gear.

Due to rapid changes in technology, operators of superannuated vehicles must purchase a newer vehicle or add after-market alternatives to enjoy technology features such as Bluetooth and vehicle cameras. For example, the input device 110 may include an aftermarket rear-view camera affixed to a location on or near the rear fascia of a vehicle (e.g., on license plate).

However many after-market alternatives do not communicate with pre-existing systems within the vehicle. Therefore, to integrate desired technology features into the vehicle, the after-market components replace many of pre-existing vehicle components within the operating vehicle system, rendering costly pre-existing components obsolete.

Pre-existing vehicle display components that provide information to drivers within the information system 101 are installed by the manufacturer in locations that optimize the effectiveness of the communicated information. However, the display components may not be optimal to integrate after-market technology. Systems that convey crash-alert information are typically located in the driver's direct line of sight and undergo extensive testing to ensure that the communicated information is intuitive and effective in terms of the desired response. Other information systems are specifically designed and located to enable an optimal viewing angle and to minimize the effects of sunlight glare. When audible alerts are required by an alert system, vehicle sound systems can more effectively convey auditory alert information by automatically muting the current radio source and activating a select speaker set to indicate the threat direction. More recent production systems use tactile devices place in the seat pan of the driver's seat to communicate the presence and direction of a threat to drivers. Thus, as a whole, vehicle systems can provide a superior interface when compared to add-on components that may have performance issues due to placement or other limitations.

SUMMARY

Given the aforementioned issues, a need exists for an after-market data information system that integrates with pre-existing data information systems. The present disclosure relates to systems for integration and communication of aftermarket vehicle components with existing vehicle components.

In one aspect, the present technology includes an apparatus comprising a processor and a computer-readable medium including computer-executable instructions. The apparatus is configured to be integrated into a vehicle comprising an existing motion-control system having existing motion-control-system components. The instructions, when executed by the processor, cause the processor to perform operations comprising (i) receiving, from an after-market motion-control-system, an input data signal containing a raw data set, (ii) processing the raw data set, yielding a processed data set, and (iii) transmitting the processed data set to one or more of the existing motion-control system components within the vehicle.

In some embodiments, the operations further comprise calibrating the apparatus using the memory recall data set.

In some embodiments, the computer-readable medium comprises an alert data set used by the processor, executing the instructions, to provide a notification to inform an operator of vehicle conditions or surrounding-environment conditions through the use of at least one pre-existing vehicle component.

In some embodiments, the apparatus further comprises an interface connector, configured to communicate with the apparatus and the existing motion-control-system, wherein the interface connector is configured to (i) receive the input signal containing the raw data set from the after-market input device, (ii) transmit the raw data set by way of a first signal to the apparatus, (iii) receive a processed data set, by way of a second signal, from the apparatus, and (iv) transmit a processed input signal containing the processed data set to the existing motion-control system within the vehicle.

In some embodiments, the first signal and the second signal form a transmission signal enabling two way communication.

In a further aspect of the present technology, the apparatus is configured to engage and disengage with an existing motion-control system having existing motion-control-system components within a vehicle.

In some embodiments, the computer-medium instructions comprise a memory recall data set derived from operator input.

In some embodiments, the computer-medium instructions comprise calibrating the apparatus using the memory recall data set.

In some embodiments, the computer-medium instructions comprises an alert data set to provide a notification to inform an operator of vehicle conditions or surrounding-environment conditions through the use of at least one pre-existing vehicle component.

In some embodiments, the apparatus transmits a module signal comprising the processed data set to a port receptacle.

In some embodiments, the port receptacle, transmits a processed port signal comprising the processed data set to the existing motion-control-system.

In some embodiments, the apparatus transmits a module expansion signal comprising the processed data set to a port expansion.

In some embodiments, the port expansion transmits a processed port expansion signal to the existing motion-control-system.

In some embodiments, the apparatus transmits a module signal comprising the processed data set to a port receptacle, configured to transmit the processed data set to a port expansion by way of a port receptacle signal.

In some embodiments, the apparatus transmits a module expansion signal comprising the processed data set to a port receptacle and a port expansion approximately simultaneously.

In some embodiments, the apparatus further comprises an interface connector, configured to communicate with the apparatus and the existing motion-control-system.

In some embodiment, the first signal and the second signal form a transmission signal enabling two way communication.

In another aspect of the present technology, the apparatus is configured to engage and disengage with an existing motion control system having existing motion-control-system components within a plurality of vehicles.

Other aspects of the present technology will be in part apparent and in part pointed out hereinafter.

DETAILED DESCRIPTION

As required, detailed embodiments of the present disclosure are disclosed herein. The disclosed embodiments are merely examples that may be embodied in various and alternative forms, and combinations thereof. As used herein, for example, exemplary, illustrative, and similar terms, refer expansively to embodiments that serve as an illustration, specimen, model or pattern.

Descriptions are to be considered broadly, within the spirit of the description. For example, references to connections between any two parts herein are intended to encompass the two parts being connected directly or indirectly to each other. As another example, a single component described herein, such as in connection with one or more functions, is to be interpreted to cover embodiments in which more than one component is used instead to perform the function(s). And vice versa—i.e., descriptions of multiple components herein in connection with one or more functions is to be interpreted to cover embodiments in which a single component performs the function(s).

In some instances, well-known components, systems, materials or methods have not been described in detail in order to avoid obscuring the present disclosure. Specific structural and functional details disclosed herein are therefore not to be interpreted as limiting, but merely as a basis for the claims and as a representative basis for teaching one skilled in the art to employ the present disclosure.

I. OVERVIEW OF THE DISCLOSURE—FIG. 2

Figure 1:
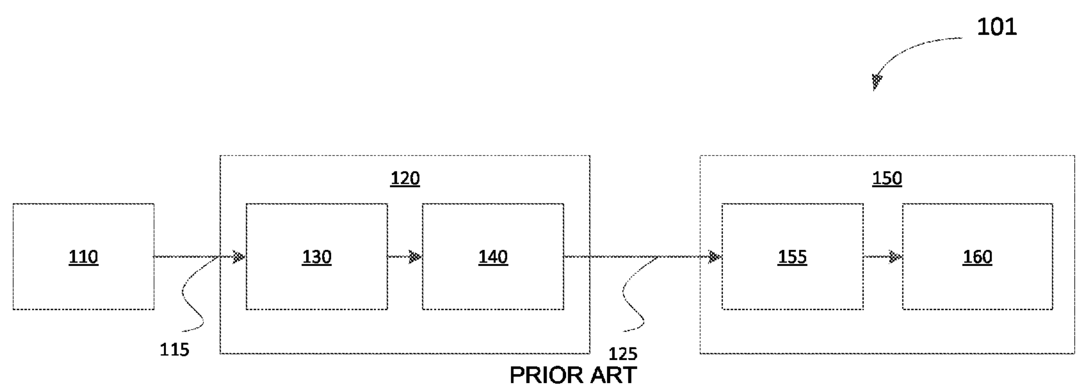
FIG. 1 illustrates the prior art for a data information system.
Figure 2:
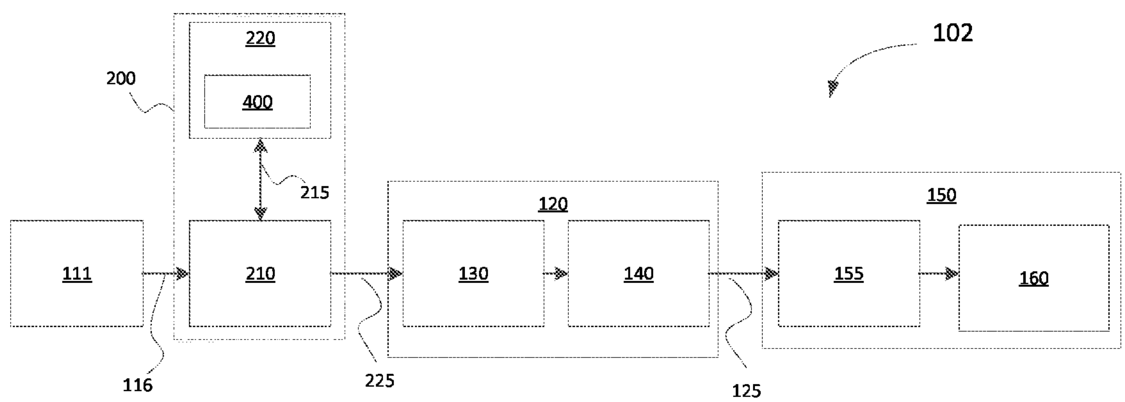
FIG. 2 illustrates a data integration system for use in an exemplary embodiment according to the technology.

FIG. 2 illustrates an information system 102 including a data integration system 200. The integration system 200 is configured and arranged to be installed into a vehicle to allow integration of pre-existing (e.g., factory installed) vehicle systems with after-market technology.

The integration system 200 is connected to, or otherwise in communication with (e.g., wireless), the information system 102 to receive data information from one or more after-market input device(s) 111, which the system 102 will then transmit to the data output device(s) 160. For example, the integration system 200 may be in communication with (i) the after-market input devices 111 via an input signal 116 and (ii) the I/O system 120 via a processed input signal 225, as seen in FIG. 2.

In one embodiment, the integration system 200 includes a vehicle interface connector 210 and an integrated module device 220.

The interface connector 210 connects the integrated device 220 to the system 102. A pre-existing output device (e.g., factory-installed display) deciphers data received from a pre-existing data input source (e.g., factory-installed camera) and translates the data into communication (e.g., video stream) understood by the vehicle operator. However, the pre-existing output device cannot decipher and/or translate data received from an after-market installed data input source 116 (e.g., after-market camera). The interface connector 210 functions to connect the integration system 200 with the system 102. More specifically, the interface connector 210 serves to receive raw input data from the after-market input device 116 and communicate processed output data, processed by the integration device 220, to the I/O system 120. The processed output data is ultimately deciphered and/or translated by the after-market output device 160.

The interface connector 210 is in some embodiments in communication with (i) the system 102, specifically, the input device(s) 111, by way of the input signal 116 and the I/O system 120 by way of the processed input signal 225, and/or (ii) the integrated device 220 by way of a transmission signal 215.

The input signal 116 is transmitted from the after-market data input device 111 to the interface connector 210. The interface connector 210 includes one or more retrofitted components that include one or more interfaces that correspond with the after-market vehicle technology components—e.g., input device(s) 111. Additionally, the processed input signal 225 is transmitted from the interface connector 210 by way of retrofitted components corresponding to the pre-existing vehicle modules—e.g., output device(s) 160. As such, the interface connector 210 serves to bridge the after-market components with the pre-existing vehicle modules.

In one embodiment, the transmission signal 215 communicates information bi-directionally to/from the connector 210. Raw data received into the connector 210 by way of the input signal 116 is transmitted to the device 220 by way of the transmission signal 215. The raw data is then processed by the integration device 220, described below, and the processed data is transmitted by way of the transmission signal 215 back to the connector 210.

The integrated device 220 in some embodiments includes a controller 400 (seen in FIG. 4) to detect, receive, process, analyze, and/or transmit information (e.g., raw data) received by the input device(s) 111. For example, when the input device 111 is a camera, the integrated device 220 may include computer-executable code, or instructions, stored in one or more modules, that, when executed by a processor, process raw video data received from the camera. As another example, when the input device 111 is a sensor, or other measurement device to detect object movement or proximity to the vehicle, the integrated device 220 instructions can cause the processor to process raw data detected by the sensor due to object motion or proximal existence.

Figure 4:
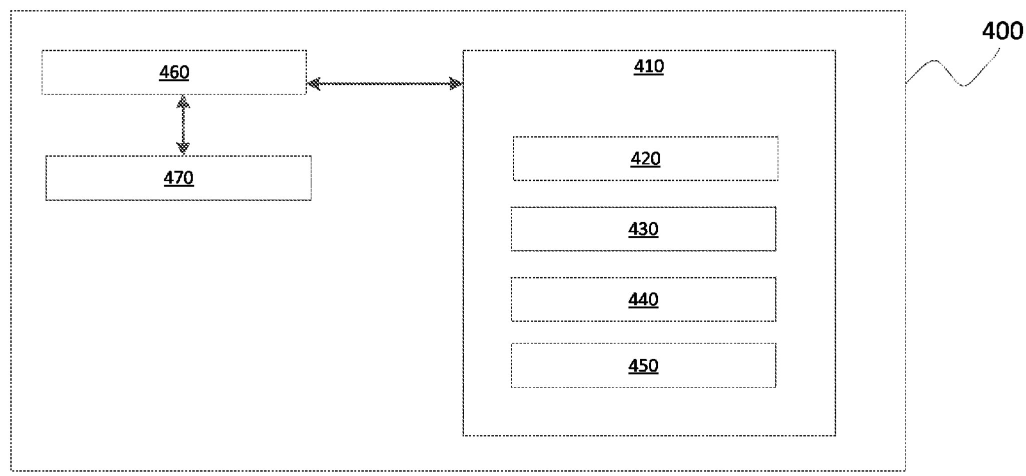
FIG. 4 is a block diagram of a controller of the data integration systems for FIGS. 2 and 3.

Referring to FIG. 4, the controller 400 may be a microcontroller, microprocessor, programmable logic controller (PLC), complex programmable logic device (CPLD), field-programmable gate array (FPGA), or the like. The controller may be developed through the use of code libraries, static analysis tools, software, hardware, firmware, or the like. Any use of hardware or firmware includes a degree of flexibility and high-performance available from an FPGA, combining the benefits of single-purpose and general-purpose systems. After reading this description, it will become apparent to a person skilled in the relevant art how to implement the technology using other computer systems and/or computer architectures.

The controller 400 includes a memory 410. The memory 410 may include several categories of software and data used in the integrated device 220, including, applications 420, a database 430, an operating system (OS) 440, and I/O device drivers 450.

As will be appreciated by those skilled in the art, the OS 440 may be any operating system for use with a data processing system. The I/O device drivers 450 may include various routines accessed through the OS 440 by the applications 420 to communicate with devices, and certain memory components.

The applications 420 can be stored in the memory 410 and/or in a firmware (not shown) as executable instructions, and can be executed by a processor 460.

The applications 420 include various programs (e.g., operational modes) that, when executed by the processor 460, process data received into the integration device 220. Operational modes are a formal characterization of a status of one or more internal data that affects behavior of the system 102. Operational modes may include, among others, a mode of input (e.g., data stream from a camera) and a mode of output (e.g., data stream to a display). Operational modes can based on vehicle capabilities such as, but not limited to, pre-existing components (e.g., displays) and positioning of a gear (e.g., shifting the vehicle into the reverse gear).

The applications 420 may be applied to data stored in the database 430, such as the specified parameters, along with data, e.g., received via the I/O data ports 470. The database 430 represents the static and dynamic data used by the applications 420, the OS 440, the I/O device drivers 450 and other software programs that may reside in the memory 410.

While the memory 410 is illustrated as residing proximate the processor 460, it should be understood that at least a portion of the memory 410 can be a remotely accessed storage system, for example, a server on a communication network, a remote hard disk drive, a removable storage medium, combinations thereof, and the like. Thus, any of the data, applications, and/or software described above can be stored within the memory 410 and/or accessed via network connections to other data processing systems (not shown) that may include a local area network (LAN), a metropolitan area network (MAN), or a wide area network (WAN), for example.

It should be understood that FIG. 4 and the description above are intended to provide a brief, general description of a suitable environment in which the various aspects of some embodiments of the present disclosure can be implemented. While the description refers to computer-readable instructions, embodiments of the present disclosure also can be implemented in combination with other program modules and/or as a combination of hardware and software in addition to, or instead of, computer readable instructions.

The term "application," or variants thereof, is used expansively herein to include routines, program modules, programs, components, data structures, algorithms, and the like. Applications can be implemented on various system configurations, including single-processor or multiprocessor systems, minicomputers, mainframe computers, personal computers, hand-held computing devices, microprocessor-based, programmable consumer electronics, combinations thereof, and the like.

Figure 5:
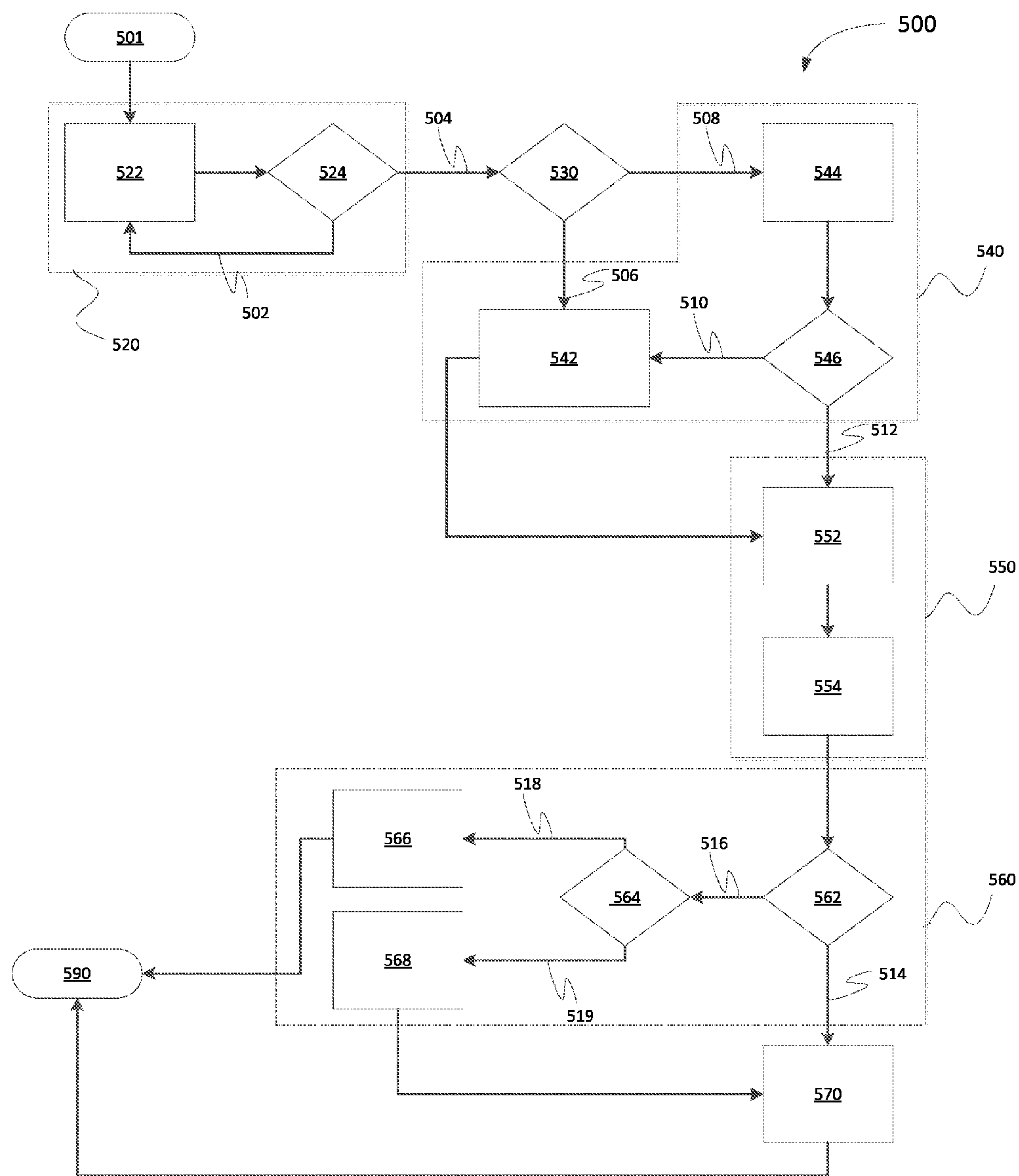
FIG. 5 is a flow chart illustrating methods associated with the data integration systems of FIGS. 2 and 3.

Further details associated with controller logic are discussed in association with FIG. 5.

In some embodiments, the integrated device 220 is portable to allow movement of the device from one vehicle to another. The portability allows a vehicle user to transfer the integration system 200 to a different vehicle without losing customized settings associated with the system 200. Portability may be a desired feature for situations in which an individual chooses to transfer an added after-market technology from one vehicle to another vehicle.

In portable embodiments, the integrated system 200 can be configured to learn the capability and characteristics of each vehicle into which the system 200 is integrated. During integration, operation of the system 200 may be tailored to utilize capabilities (e.g., visual, auditory, and tactile displays, existence of a vehicle braking interface) of each vehicle and may choose a parameter set that is appropriate for each vehicle (e.g., vehicle width). Further characteristics of portable integrated devices are discussed below in association with FIG. 3.

The integrated device 220 may be in communication with the interface connector 210 by way of a wired connection, such as a low voltage differential signaling (LVDS) data transfer cable or a gigabit video interface (GVIF) cable, among others. The integrated device 220 may also communicate with the interface connector 210 by way of a wireless connection (e.g., Bluetooth). Digital signals transmitted by the integrated device 220 via the wired or wireless communication components may be serialized/deserialized (SerDes) and transmitted using a conventional transmission device (e.g., Ethernet cable, USB).

After raw data from the input devices 111 is processed by the controller 400 and transmitted to the interface connector 210, the processed data (e.g., video, measurement) is communicated to the I/O system 120 by way of the processed input signal 225. In other words, the data processed by the integrated device 220 is transmitted, through the connector 210, in a manner that is compatible with the pre-existing vehicle data components (e.g., the harness 130 and the production connector 140).

The I/O system 120, via the harness 130 and the connector 140, communicates the processed data by way of the output signal 125 to the output device(s) 160 within the center stack 150 of the vehicle.

As an example, the I/O system 120 may communicate by way of the output signal 125 dynamic activation of the output device 160 upon detecting cautions of within the purview of the input device(s) 111. More specifically, the I/O system 120 may actuate a specific display (e.g., a graphic overlay) or sensory output (e.g., a tactile transducer installed in a seat of the vehicle) within the output device(s) 160 at the direction of the integrated device 220.

II. ALTERNATE EMBODIMENT—FIG. 3

Figure 3:
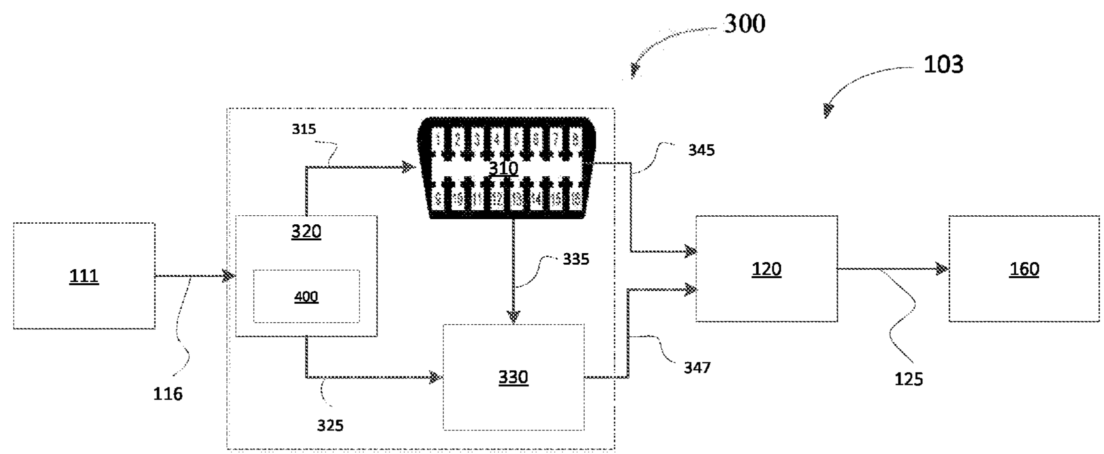
FIG. 3 illustrates an alternate embodiment of the data integration system of FIG. 2.

FIG. 3 illustrates a removable integration system 300, which provides an alternate to the integration system 200 of FIG. 2. Similar to the integration system 200 of FIG. 2, the removable integration system 300 of FIG. 3 allows after-market technology components to be installed and compatible with pre-existing vehicle components within an information system 103. However, the removable integration system 300 is configured to be portable for ease of installation and transferability.

As seen in FIG. 3, data is received through one or more input devices 111, and then transmitted by way of the input signal 116 to the removable system 300. The removable system 300 may include a removable device 320, which integrates with (1) receptacle pre-existing components within a vehicle, e.g., an on-board diagnostic (OBD) port 310 or a USB plug-in device, and/or (2) after-market components within a vehicle, e.g., an OBD port expansion 330.

In some embodiments, the removable integration system 300 may also include a connector (not shown), similar to the connector 210 shown in FIG. 2, to integrate the removable device 320 into the system 102 by way of one or more retrofit modules.

The removable device 320 serves the same functionality as the integration device 220—e.g., process raw data through the controller 400 received by after-market input devices 111. However, the removable device 320 may also acquire vehicle state information from recognizable diagnostic interfaces such as, for example, the OBD port 310. The removable device 320 may also interact with compatible application software on the head unit that has been downloaded and installed by the user. In such cases, the native capabilities of the display unit could be enhanced via the added software. Such types of infotainment units are deployed to support vehicle software applications (e.g., ONSTAR®, a registered trademark of Onstar LLC, a Delaware company).

Once raw data has been processed by the removable device 320, the processed data is communicated to the port 310 by way of a module signal 315, and/or the expansion port 320, by way of a module expansion signal 325. The processed data is communicated to the port 310 and/or the expansion port 320 in a format that is identifiable by pre-existing vehicle systems. More specifically, the removable device 320 configures data in such a way that the processed data may be communicated to pre-existing systems within the vehicle and communicated to the vehicle operator.

The removable device 320 may be in communication with the port 310 or the port expansion 330, by way of a wired and/or a wireless connection, as described in association with the integration device 220 discussed above. Digital signals transmitted by the integrated device 320 via wired or wireless communication components may be altered using SerDes, or other method.

The OBD port 310 provides access to the onboard serial data networks of the vehicle. Some of this data is regulated to enable service centers to diagnose and repair vehicle systems (e.g., data from an engine control unit (ECU) (not shown) offers a source of information when troubleshooting problems within vehicle sub-systems by a vehicle owner, repair technician, or the like). Other data at this port is proprietary and enables a properly configured tool to access multiple vehicle data networks that include information about vehicle body systems (e.g., vehicle displays, HVAC systems, button or switch presses), vehicle powertrain systems (e.g., engine-specific data such as fuel injector status, engine rpm), vehicle chassis systems (i.e., vehicle stability control system status) and vehicle object detection sensor systems (e.g., information about objects that have been detected from camera, radar or Lidar systems). The port 310 includes an interface, which may be any interface known in the art (e.g., OBD I or II) and produce any number of protocol signals know in the art (e.g., SAE J1850 pulse width modulation or variable pulse width).

The signals produced by the port 310, regardless of the signal protocol, defines a method for requesting various types of diagnostic data as a list of standard parameters that may be available from the ECU. The parameters available are addressed by parameter identification numbers (PIDs), which are requested and retrieved by a system given access to real time performance data as well as flagged diagnostic trouble codes (DTCs). The processed port signals produced by port 310 also contain normal mode (e.g., proprietary) communications that can be monitored by a software that can interpret definitions associated with the normal mode and signal encoding. Such messages may include additional information about vehicle systems not provided by a regulated diagnostic system interface. The software that can interpret information produced by port 310 can monitor the same data sets monitored by ECUs and transmit data sets on the vehicle network in the same manner as existing production ECUs. This transferability of information enables the integrated device 200 or the removable device 300 to integrate with existing vehicle systems.

The port 310 interface may be configured to communicate with the (1) removable device 320, described above, (2) port expansion 330, and/or (3) I/O system 120.

In some embodiments, the port 310 is in communication with the port expansion 330 by way of an OBD signal 335. The OBD signal 335 may communicate processed data received by the removable device 320 to the port expansion 330. The OBD signal 335 may also communicate other vehicle specific information (e.g., diagnostic information) to the port expansion 330. For example, the port expansion 330 may require a data stream (e.g., a factory installed camera) obtained directly by the port 310. In such a scenario, the data stream may be requested by and communicated to the port expansion 330 by way of the OBD signal 335.

In some embodiments, the port 310 is in direct communication with the I/O system 120 by way of a processed port signal 345. Similar to the OBD signal 335, the processed port signal 345 may communicate processed data received by the removable device 320 and/or vehicle specific to the I/O system 120. The I/O system 120 then communicates, by way of the output signal 125, to output device(s) 160 data communicated by the port 310.

The OBD port expansion 330 has a function similar to that of the port 310. An electronic engine control (EEC) is a series of ECUs, some of which contain a port to allow access to the ECU memory to override the memory, if necessary, with a different programmed module for purposes such as but not limited to changing the ECU calibration data within the ECU memory (e.g., remapping).

The port expansion 330 may be necessary when the port 310 does not have the data transfer capability required to communicate with the I/O system 120. As an example, the port 310 may facilitate transmission of a data message less than 110 bytes, including a critical redundancy check. However, if the after-market technology component must transmit messages of 15 bytes, the port expansion 330 may be used to facilitate such an increase in data transmission capability.

The port expansion 330 may also be necessary when the port 310 does not have open positions with which to receive an addition system (e.g., removable device 320). For example, the port 310 may be configured to receive 12 pins, however, if the after-market technology requires an additional 2 pins (e.g., for the input device 111 and the removable device 320), the port expansion 330 may be used to facilitate such an increase in pin space capability.

The port expansion 330 may be configured to interface with the (1) removable device 320, described above, (2) I/O system 120, and/or (3) port expansion 310.

In some embodiments, the port expansion 330 may be configured to facilitate communication, by way of a processed expansion port signal 347, to the I/O system 120. The processed port expansion signal 347 may communicate (i) processed data received by the removable device 320, (ii) processed data and/or vehicle specific from the port 310, and/or (iii) vehicle specific information determined within the port expansion 330 system (e.g., diagnostic information of systems in communication with port expansion 330). The I/O system 120 then communicates, by way of the output signal 125, to output device(s) 160 data communicated by the port expansion 330.

It should be noted that when the OBD signal 335 transmits data to the port expansion 330, the processed port signal 345 may not be required because data communicated to the port expansion 330 may be communicated to the I/O system 120 by way of a processed port expansion signal 347.

The I/O system 120 manages the interfaces between the data input device(s) 111 and the removable integration system 300. The I/O system 120 may (i) combine the input devices(s) 111 into a single data stream communicated to the removable system 300, (ii) communicate only one relevant data stream (e.g., a rear camera data stream when the vehicle is shifted into the reverse position) to the removable system 300, and/or (iii) communicate multiple data streams to the removable system 300.

As described above, the I/O system 120 may communicate, by way of the output signal 125, a command for the output device 160 to dynamically activate on detected a perceived caution of within the purview of the input device (s) 111. More specifically, the I/O system 120 may actuate a specific display (e.g., a graphic overlay, optionally accompanied by a tactical response) at the direction of the device 320.

It is understood by one skilled in the art that the integration system 200 and the removable integration system 300 may include one or more other devices and components. Additional components may be included in the integration system 200 to allow the system 200 to maintain the additional components. For example, the integration system 200 may include an encoder (not shown) to encode and decode data transmitted from/to the integration system 200. As another example, the integration system 200 may include a converter (not shown) to convert National Television System Committee (NTSC) format data to Phase Alternating Line (PAL) format data, or vice versa. The converters may also be employed to convert combinations of analog and digital video formats (e.g., VGA, HDMI, LVDS, GVIF).

III. METHOD OF INTEGRATION MODULE OPERATION—FIG. 5

FIG. 5 is a flow chart illustrating a configuration process executed by the integration systems 200, 300.

It should be understood that the steps of the methods are not necessarily presented in any particular order and that performance of some or all the steps in an alternative order, is possible and is contemplated.

The steps have been presented in the demonstrated order for ease of description and illustration. Steps can be added, omitted and/or performed simultaneously without departing from the scope of the appended claims. It should also be understood that the illustrated method or sub-methods can be ended at any time.

In certain embodiments, some or all steps of this process, and/or substantially equivalent steps are performed by a processor, e.g., computer processor, executing computer-executable instructions, corresponding to one or more corresponding algorithms, and associated supporting data stored or included on a computer-readable medium, such as any of the computer-readable memories described above, including the remote server and vehicles.

The process 500 depicts a method by which the device 220 and the removable device 320 may execute the communication of data to the I/O system 120. The method 500, among other methods, (i) commissions the device at grouping 520, (ii) identifies a vehicle at step 530, (ii) calibrates the device at grouping 540, (iii) operates the device at grouping 550, (iv) executes an alert, if required, at grouping 560, and (v) displays output data at step 570.

The software may be engaged at step 501 through a controller, described in association with FIGS. 2 and 3. The controller sends an "engage response mode" message through an interface, which sends the initial request to commission the response mode as seen in the commission grouping 520.

III.A. Commission of the Integration Device

The commission grouping 520 begins by the software within the devices 220, 320 being in standby mode at step 522. In standby mode the devices 220, 320 each have their respective power bus in a disengaged position (e.g., power bus is "off"). When the bus is disengaged, there is no conversion of digital input data into phase modulated signals, which are demodulated and output to another component. More specifically, the devices 220, 320 are not operational.

The commission grouping 520 continues the software process by determining whether an event that engages the bus ("commission event"), has occurred at step 524. Events that engage the bus will commission the devices 220, 320.

A commission event may occur due to a periodic change in time. A commission event can be requested by the controller at a designated time interval, preset within the controller. The time interval may be set, changed, or adjusted based on a particular application of the process 500. For example, use of the process 500 within the automotive industry may require a time interval that is different from the use of the process 500 within the nautical or aeronautical industries.

A commission event may also occur due to the occurrence of a trigger event, by one or more systems within the vehicle. A trigger event is a specific action, preset within the controller, which communicates to the controller when the action occurs within a vehicle system. A trigger event may be any sensory response perceived by the device 220, 320, such as but not limited to haptic (e.g., vibration), signal receipt (e.g., signal received by device to commission when vehicle ignition is enabled). For example, opening and/or closing the vehicle door may be classified as a trigger event that commissions of the devices 220, 320.

If no commission event has occurred (e.g., path 502), the devices 220, 320 remain in standby mode at 522.

If a commission event has occurred (e.g., path 504), the process 500 software then identifies a vehicle at step 530.

III.B. Vehicle Identification by the Integration Device

To identify the vehicle at step 530, the software determines whether the particular vehicle has a memory recall data set available. The memory recall data set may contain features such as, but not limited to, recent commands and personal preferences of the vehicle operator and/or information from vehicle sub-systems. The memory recall allows the controller to determine which settings to deploy within the calibration grouping 540.

If a memory recall data set is not available for the vehicle (e.g., path 506), the software will require user calibration within the calibration grouping 540.

III.C. Calibration of the Integration Device

The user calibration at step 542 requires the system user provide a learning cycle for the software, wherein the software detects the after-market components (e.g., after-market input devices 111) and enables the components to function with the pre-existing components (e.g., output devices 160). Initial calibration information may include information such as, but not limited to function of the after-market input devices 111 (e.g., video data for a camera), location and position of the input devices 111 (e.g., height of a camera above ground or other reference point), and vehicle operator information (e.g., head position of the vehicle operator in reference to a stationary location such as the vehicle ceiling).

The function, location, and position of the input device(s) 111 may be integrated and calibrated through an interface within an internal system (e.g., portal to receive interface from a USB or other data storage device). The input devices 111 may also be integrated to the systems 102, 103 based on external systems (e.g., smartphone interface).

Vehicle operator information may be used to create an enhanced experience for the vehicle operator. Within an enhanced vehicle operation state, the system may perceive information about the vehicle operator that is associated with vehicle systems (e.g., how often does the vehicle operator access information on the center stack 150). The system may also perceive personal information about the vehicle operator, such as, but not limited to, operator head position within the vehicle, operator blink rate, the number of operators for the vehicle and preferences associated therewith.

When user calibration is complete at step 542, the process 500 executes the operation grouping 550, described below.

Back at step 530, if a memory recall data set is available for the vehicle (e.g., path 508), the software may utilize automatic calibration within the calibration grouping 540.

The automatic calibration at step 544 recalls the memory data set available for the vehicle. As mentioned above, the memory recall data set may contain features such as, but not limited to, recent commands of the vehicle operator, personal preferences of the vehicle operator, diagnostic information from vehicle systems. The memory recall data set may be housed within a memory repository (not shown) internal and/or external to the controller.

Once the automatic calibration has completed at step 544, the software determines whether the automatic calibration is successful at step 546. The automatic calibration is successful (e.g., path 512) if the software is able to recall the memory data set for the vehicle.

If the automatic calibration is unsuccessful (e.g., path 510), the software will require user calibration at step 542, as discussed above. When user calibration is complete at step 542, the process 500 moves to the operation grouping 550.

III.D. Operation of the Integration Device

After user calibration at step 542 or successful automatic calibration at step 446, the software performs data acquisition at step 552. During data acquisition, the devices 220, 320 acquire data (e.g., raw data) transmitted from the after-market input device(s) 111 by way of the after-market input signal 116. For example, if the input device 111 is camera, the data acquisition at step 552 is configured to receive a video data set provided by the camera. As another example, if the input data device 111 is a Bluetooth system, the data acquisition is configured to receive an information (e.g., music) data set provided by the Bluetooth system.

Once the data has been acquired, the software processes the data acquisition at step 554. During and after data processing, the devices 220, 320 are in communication, by way of a wired and/or a wireless connection, with other system component as described in association with the integration device 220 and the removable device 320 above. Digital signals transmitted by the devices 220, 320 via wired or wireless communication components may be altered using SerDes, or other method. For example, a video data set provided by a camera may be processed by one or more controllers to form or one or more data streams used for form a processed input signal (e.g., signal 225 and signal 325) communicated from the devices 220, 320.

III.E. Optional Alerts from the Integration Device

In some embodiments, the process 500 may contain software instruction that initiate an alert sequence 560. The alert sequence may be utilized where warnings, displays, or the like need to be communicated to another vehicle system or to the vehicle operator.

In these embodiments, the alert sequence commences by the software first, determining if an alert is in fact necessary at step 562. An alert may be necessary if communication of information (e.g., normal mode communications or diagnostic information) may result in vehicle systems or the vehicle operator taking corrective action based on the communicated information.

If an alert is not required (e.g., path 514), the processed data is communicated to the vehicle operator by the output devices 160 at step 570, described below.

If an alert is necessary (e.g., path 516), the software determines, at step 564, if a visual output device (e.g., display) is available to communicate information to the vehicle operator. The software may also communicate with the vehicle operator by other sensory methods (e.g., auditory, haptic, and the like).

If a visual output device is not available (e.g., path 518), an alert is generated by non-visual methods such as, but not limited to, auditory and tactile alerts at step 566. The non-visual methods may be generated by the device 220, 320 by communicating (i) an alert to the vehicle operator directly through internal system components (e.g., device 220, 320 beeps or vibrates) or (ii) a signal to request an alert through another existing vehicle system (e.g., dynamic text warning, existing icon graphic warning, chime capability, haptic feedback via the port 310 interface or via the expansion port 330 interface). For example, a non-visual alert may be communicated to the vehicle radio and emitted through speakers within the vehicle.

Once the alert is communicated to the vehicle at step 566, the controller within the device 220, 320 disengages the power bus by (i) automatically disengaging after an alert is transmitted at step 568 or (ii) sending a "disengage response mode" message through an interface, which ends the process 500 at step 590.

If a visual output device is available (e.g., path 519), a visual alert is generated at step 468. The visual alert may be a produced by the device 230, 320 and communicated for display at step 570. For example, the visual alert could be a graphic alert may be a warning graphic (e.g., overlay on top of pre-existing output device display image).

III.F. Display of Relevant Data

At step 570, relevant data is displayed for the vehicle. The data displayed at step 570 may be (i) processed data from step 554 and/or (ii) a visual alert from step 566. When step 570 displays a visual alert from step 566, the alert may be dynamically activated by the output device 160 (e.g., to display a graphic image). For example, the output device 160 may dynamically activate a rear camera display based on caution perceived within the area of the rear camera data feed.

Once the data is displayed at step 570, the device 220, 320 disengages the power bus. To disengage the power bus, the controller may (i) automatically disengage after an alert is transmitted at step 570 or (ii) send a "disengage response mode" message through an interface, which ends the process 500 at step 590.

IV. SELECTED FEATURES

Many features of the present technology are described herein above. The present section presents in summary some selected features of the present technology. It is to be understood that the present section highlights only a few of the many features of the technology and the following paragraphs are not meant to be limiting.

The technology associated with an integration system enables an after-market device to integrate with pre-existing vehicle components to integrate after-market technology. Rapid changes in technology force vehicles to use after-market alternatives to import technology features into the vehicle. In some embodiments, the integration system augments pre-existing video viewing applications.

The technology also enables the integration system to extend to a variety of data-based applications. In some embodiments, the integration system may augment video application. In other embodiments, the system may augment data transfer by way of after-market and pre-existing communication components.

The technology enables software that has the ability to automatically configure pre-set parameters recognized by the integration system. Automatic configuration prevents the vehicle operator from continually entering calibration information each time the after-market system is enabled. In one embodiment, the system automatically configures the system software when parameters of the vehicle are recognized.

Another benefit is the ability of the integration system to support automatic configuration for different original equipment manufacturers (OEMs). Supporting a variety of OEMs enables the system to be moved to a different vehicle.

The technology also allows the integration system to acquire vehicle state information from a recognizable diagnostic interface. Utilizing a vehicles diagnostic interface allows communication of the integration system with other pre-existing vehicle systems. In some embodiments, the integration system may be in communication with ports that acquire vehicle state information.

Yet another benefit is the technology dynamically activates an alert when a perceived instance of caution the purview of the after-market technology input device. Dynamic activation assists in providing the vehicle operator with accurate information about environmental surroundings of the vehicle.

V. CONCLUSION

Various embodiments of the present disclosure are disclosed herein. The disclosed embodiments are merely examples that may be embodied in various and alternative forms, and combinations thereof.

The above-described embodiments are merely exemplary illustrations of implementations set forth for a clear understanding of the principles of the disclosure.

Variations, modifications, and combinations may be made to the above-described embodiments without departing from the scope of the claims. All such variations, modifications, and combinations are included herein by the scope of this disclosure and the following claims.

What is claimed is:

1. An apparatus, for integration with a vehicle, comprising:

a processor;

an interface connector configured to communicate with an existing input/output system within the vehicle, wherein the interface connector is configured to:

(i) receive, from an aftermarket input device having aftermarket components, an input data signal containing a raw data set;

(ii) transmit the raw data set by way of a first signal to the processor;

(iii) receive a processed data set, by way of a second signal, from the processor; and (iv) transmit a processed input signal containing the processed data set to the existing input/output system within the vehicle; and a computer-readable medium comprising computer-executable instructions that, when executed by the processor, cause the processor to perform operations comprising:

(i) receiving, from the interface connector, the first signal containing the raw data set;

(ii) processing the raw data set, yielding the processed data set; and (iii) transmitting the processed data set, by way of the second signal, to the interface connector.

2. The apparatus of claim 1, wherein the instructions comprise a memory recall data set derived from vehicle-operator input.

3. The apparatus of claim 2, wherein the operations further comprise calibrating the apparatus using the memory recall data set.

4. The apparatus of claim 1, wherein the computer-readable medium comprises an alert data set used by the processor, executing the instructions, to provide, by way of at least one pre-existing vehicle component, a notification to inform a vehicle operator of vehicle conditions or surrounding-environment conditions.

5. An apparatus, for integration with a vehicle, comprising:

a processor;

an interface connector configured to communicate with an existing input/output system within the vehicle, wherein the interface connector is configured to:

(i) receive, from an aftermarket input device having aftermarket components, an input data signal containing a raw data set;

(ii) transmit the raw data set by way of a first signal to the processor;

(iii) receive a processed data set, by way of a second signal, from the processor; and (iv) transmit, by way of the second signal, the processed input signal containing the processed data set to the existing input/output system within the vehicle; and a computer-readable medium comprising computer-executable instructions that, when executed by the processor, cause the processor to perform operations comprising:

(i) receiving, from the interface connector, the first signal containing the raw data set;

(ii) processing the raw data set, yielding the processed data set; and (iii) transmitting, by way of the second signal, the processed data set to the interface connector, wherein the apparatus is configured to removably engage and disengage with the input/output system.

6. The apparatus of claim 5, wherein the computer-executable instructions comprise a memory recall data set derived from vehicle-operator input.

7. The apparatus of claim 6, wherein the computer-executable instructions when executed by the processor, cause the processor to further perform operations comprising calibrating the apparatus using the memory recall data set.

8. The apparatus of claim 5, wherein the computer-medium instructions comprises an alert data set to provide, by way of at least one pre-existing vehicle component, a notification to inform an operator of vehicle conditions or surrounding-environment conditions.

9. The apparatus of claim 5, wherein the computer-executable instructions, when executed by the processor, cause the processor to transmit a module signal comprising the processed data set to a port receptacle.

10. The apparatus of claim 5, further comprising a port receptacle configured to transmit a processed port signal comprising the processed data set to the input/output system.

11. The apparatus of claim 5, wherein the computer-executable instructions, when executed by the processor, cause the processor to transmit a module expansion signal comprising the processed data set to a port expansion.

12. The apparatus of claim 5, further comprising a port expansion configured to transmit a processed port expansion signal to the input/output system.

13. The apparatus of claim 5, wherein the computer-executable instructions, when executed by the processor, cause the processor to transmit a module signal comprising the processed data set to a port receptacle, configured to transmit the processed data set to a port expansion by way of a port receptacle signal.

14. The apparatus of claim 5, wherein the computer-executable instructions, when executed by the processor, cause the processor to transmit a module expansion signal comprising the processed data set to a port receptacle and a port expansion approximately simultaneously.

15. An apparatus, for integration with a vehicle, comprising:

a processor; and an interface connector configured to communicate with a plurality of existing input/output systems within a vehicle, wherein the interface connector is configured to:

(i) receive, from a plurality of aftermarket input devices, each having aftermarket components, a plurality of input data signals containing a plurality of raw data sets;

(ii) transmit the raw data sets by way of a first signal to the processor;

(iii) receive a processed data set, by way of a second signal, from the processor; and (iv) transmit a processed input signal containing the processed data set to the plurality of existing input/output systems; and a computer-readable medium comprising computer-executable instructions that, when executed by the processor, cause the processor to perform operations comprising:

(i) receiving, from the interface connector, the first signal containing the raw data set;

(ii) processing the raw data set, yielding a processed data set; and (iii) transmitting the processed data set to the interface connector, wherein the apparatus is configured to engage and disengage with the plurality of input/output systems.

* * * * *